May 14, 1963 M. H. GROVE 3,089,224
METHOD FOR THE MANUFACTURE OF VALVE BODIES
Filed Dec. 19, 1960 3 Sheets-Sheet 1
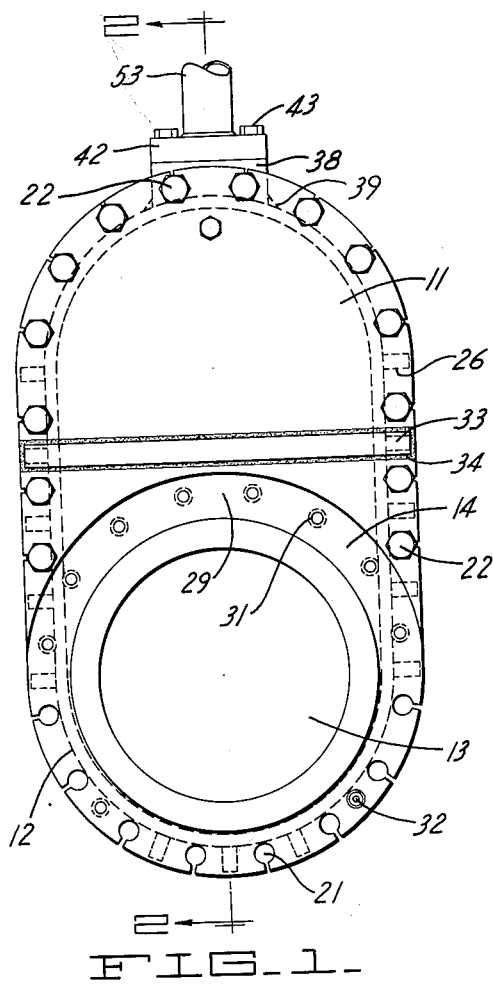
FIG_1_
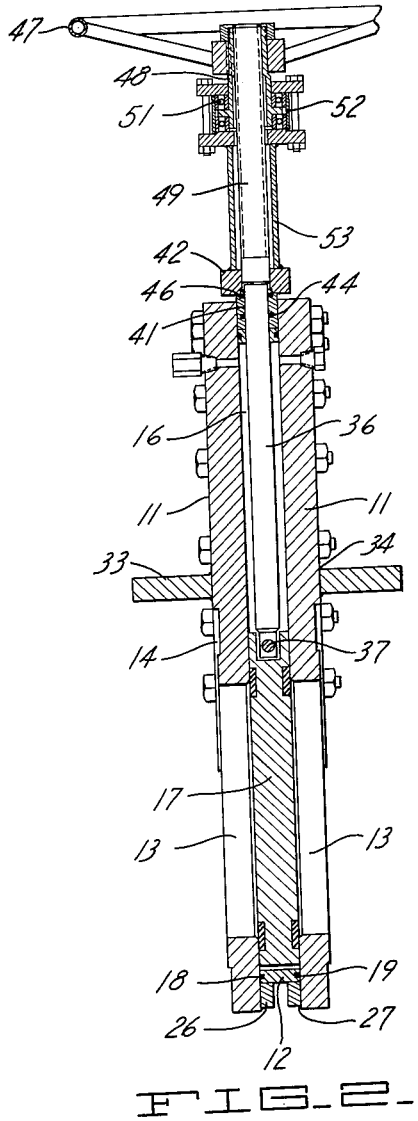
FIG_2_
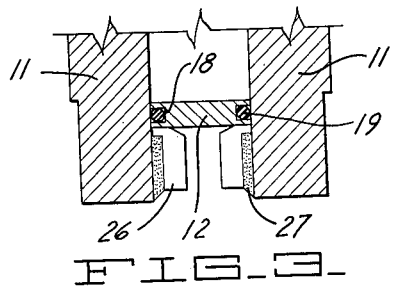
FIG_3_
INVENTOR.
Marvin H. Grove
BY
Flehr and Swain
ATTORNEYS.

May 14, 1963   M. H. GROVE   3,089,224
METHOD FOR THE MANUFACTURE OF VALVE BODIES
Filed Dec. 19, 1960   3 Sheets-Sheet 2
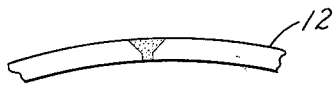
FIG_5_
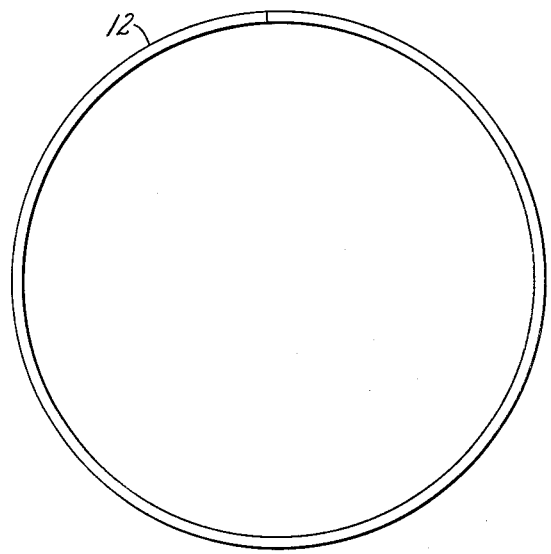
FIG_4_
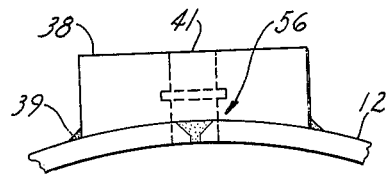
FIG_6_
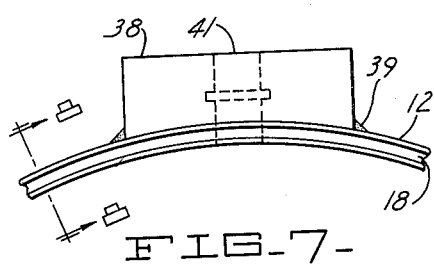
FIG_7_
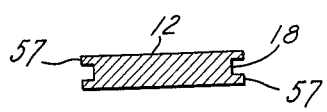
FIG_8_
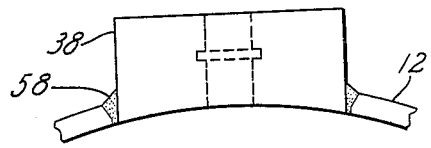
FIG_9_
INVENTOR.
Marvin H. Grove.
BY
ATTORNEYS May 14, 1963 — M. H. GROVE — 3,089,224
METHOD FOR THE MANUFACTURE OF VALVE BODIES
Filed Dec. 19, 1960 — 3 Sheets-Sheet 3
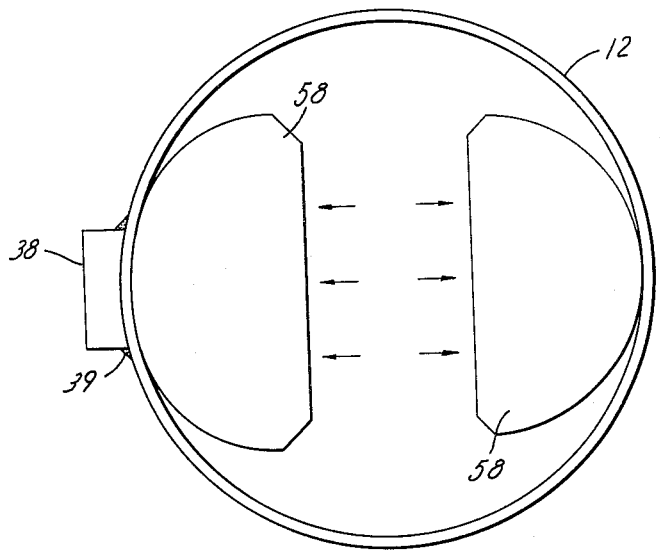
FIG_10_
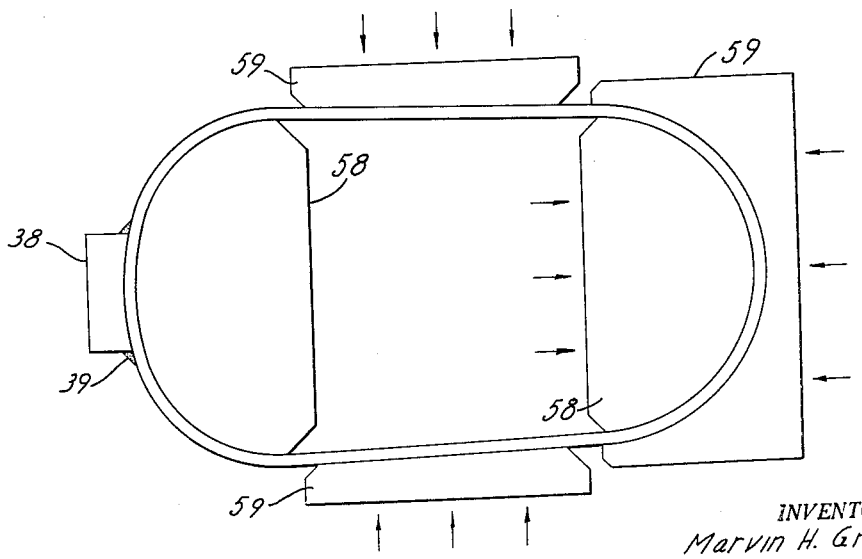
FIG_11_
INVENTOR.
Marvin H. Grove.
BY
Flehr and Swain
ATTORNEYS United States Patent Office 3,089,224
Patented May 14, 1963

3,089,224
METHOD FOR THE MANUFACTURE OF
VALVE BODIES
Marvin H. Grove, 340 Hillside Ave., Piedmont, Calif.
Filed Dec. 19, 1960, Ser. No. 76,902
5 Claims. (Cl. 29—157.1)

This invention relates generally to methods for the manufacture of valve bodies for valves of the gate type. The application is a continuation-in-part of my co-pending application, Serial Number 37,319, filed June 20, 1960 for "Valve Construction."

Most conventional gate valves that have been manufactured in the past employ valve bodies made of cast metal. More recently gate valve bodies have been fabricated from metal parts bolted or welded together. For example as disclosed in my aforesaid co-pending application, Serial Number 37,319, side plate-like parts can be bolted together upon an intermediate body part. The intermediate body part may be in the form of a metal band shaped in accordance with the general configuration of the body, and supported against outward deflection by lugs or other means carried by the side parts. It is convenient to employ resilient seal rings of the O-ring type between the body parts. This necessitates providing machined recesses or grooves in either the side or the intermediate body parts. The machining of such recesses in the end faces of an intermediate body part that is of oval configuration is a difficult operation, and requires the use of an expensive special milling machine.

It is an object of the present invention to provide a novel method for the manufacture of such a gate valve body, and which in particular eliminates expensive and difficult milling operations, and substitutes a simple turning operation for forming recesses in the intermediate body part.

A further object of the invention is to provide a method of the above character which carries out the major part of the machining operations upon a cylinder formed from a cylindrically shaped band, and which subsequently transforms this cylinder to the oval shape desired for the manufacture of an intermediate part of a valve body.

Additional objects and features of the invention will appear from the following description in which the preferred embodiments are set forth in detail in conjunction with the accompanying drawings.

Referring to the drawings:

FIGURE 1 is a side elevational view illustrating a gate valve of the fabricated body type;

FIGURE 2 is a cross sectional view taken along the line 2—2 of FIGURE 1;

FIGURE 3 is a detail in section showing how the intermediate body part is held in clamped relation to the side body parts;

FIGURE 4 is a side elevational view of a cylinder formed from a cylindrically shaped band, and represents one phase in the manufacturing method;

FIGURE 5 is an enlarged detail illustrating the weld connection which secures together the ends of the band which forms the cylinder;

FIGURE 6 illustrates another phase in the method, in which a bonnet block is attached to the band which forms the cylinder;

FIGURE 7 illustrates another phase in the method wherein the end faces of the cylinder are machined to provide seal ring recesses;

FIGURE 8 is a cross sectional detail taken along the line 8—8 of FIGURE 7;

FIGURE 9 is a view like FIGURE 6, but showing another embodiment of the present invention;

FIGURE 10 is a plan view schematically illustrating the method by which the cylinder which is to constitute the intermediate body part is formed to the desired shape; and FIGURE 11 is a view like FIGURE 10 showing the method by which the cylinder which is to constitute the intermediate body part is bent to final form.

My method can best be explained after describing the valve construction illustrated in FIGURES 1-3. In general, the body of this valve is formed of rigid side plates 11, which may be duplicates, together with an intermediate body part 12. The side body parts 11 can be formed of flat mill rolled steel or suitable metal or metal alloy, with a noval configuration as shown in FIGURE 1. Aligned openings 13 are formed in the side body parts and form flow passages for making connection with associated piping. The outer faces of the side body parts surrounding the openings 13 can be suitably machined as indicated at 14, for cooperating with associated pipe coupling flanges. The inner body space 16 serves to accommodate the valve gate 17. This gate is shown in the form of a slab with flat parallel side faces.

The intermediate body part 12 is a continuous oval shaped metal band. As best shown in FIGS. 3, 7 and 8, the end faces of this part are provided with grooves or recesses 18 for accommodating the seal rings 19, as, for example, seal rings 19 of the resilient O-ring type.

The margins of the side body parts 11 are provided with circumferentially spaced openings 21 for accommodating the clamping bolts 22. Lugs 26 are mounted upon the margins of the side body parts, as by weld connections 27, and are disposed to engage the outer surface of the intermediate body part 12. These lugs are disposed between the bolts 22 and are located whereby the lugs, rather than the bolts, are engaged and serve to resist outward deflection of the intermediate body part.

In FIGURE 1, the bolt circle for an associated pipe coupling flange is indicated at 29. For one-half of this bolt circle threaded openings 31 are shown, which are adapted to receive clamping studs. For the lower half, bolts are extended through the openings 21, and are of sufficient length to extend through pipe coupling flanges. Likewise for this lower portion of the valve body supplemental clamping screws 32 are provided, to hold the body parts clamped together irrespective of whether or not the valve is connected in a pipe line.

The side body parts 11 are shown reinforced against outward deflection by the metal ribs 33. These ribs extend across the sides of the body as shown in FIGURE 1, and may be secured to the side body parts 11 by suitable means such as weld connections 34.

The valve operating means illustrated in FIGURE 2 is of the hand wheel type. A stem 36 of the operating valve has its inner end attached to one edge of the gate 17 by means of pin 37. A bonnet block 38 is seated upon the outer peripheral surface of the intermediate body part 12 at the upper or operator end of the valve, and is fixed to the intermediate body part as by weld connections 39. The operating rod 36 extends through a bore 41 formed through the block 38 and the adjacent portion of the intermediate part 12. A bonnet plate 42 is mounted upon the outer face of the bonnet block 38, as by means of screws 43. Suitable means such as resilient seal rings 44 and 46 of the resilient O-ring type, serve to prevent leakage of line fluid past the operating rod. Block 38 is provided with holes for accommodating two of the body bolts 22, whereby the block is securely anchored to the body. A hand wheel 47 is shown carried by the nut 48. This nut engages the threaded portion 49 formed on the exterior end of the operating rod. A suitable bearing means 51 serves to journal the nut and is carried within a bearing mounting 52 upon the yoke 53. The yoke in turn is mounted upon the bonnet plate 42.

Suitable means are provided for forming seals between the sides of the gate and the body. In the particular type of valve illustrated, the sealing means is carried by the gate and for closed position engages both surfaces of the side body parts in regions surrounding the openings 13. Suitable seating means is disclosed and claimed in my co-pending application, Serial Number 830,807, filed July 31, 1959.

In accordance with the present method, the intermediate part 12 is constructed as follows: A flat metal strip of proper dimensions is first bent into a cylinder. This strip may, for example, be formed of mill rolled steel or steel alloy having sufficient ductility for cold bending. The ends of the strip are secured together by welding (see FIG. 5). At this point of welding it is desirable to attach a bonnet block 38, as by welding. The end faces of the cylinder, together with the corresponding side faces of block 38, are now finished as by grinding, to a predetermined dimensioning between end faces. Thereafter instead of resorting to expensive milling operations, this assembly is placed in a suitable turning machine, as, for example, any one of several varieties of lathes, and by simple machine turning, the continuous grooves 18 are machined in both end faces. Thereafter by a simple bending operation, the cylinder is bent to an oval form corresponding generally to the oval configuration shown in FIGURE 1.

FIGURES 4–9 illustrate various phases in the method described above. FIGURE 4 illustrates the band after it has been bent to cylindrical form, with its ends in abutting relation. FIGURE 5 illustrates how the ends of the band are secured together by welding. FIGURE 6 illustrates application of the weld block 38 by welding. At this time, or at some other convenient phase of the manufacturing process, the bore 41 can be drilled and machined for receiving the valve operating stem 36. Also a seal weld can be applied in the region indicated at 56, to prevent leakage between the block 38 and the band.

FIGURE 7 illustrates the band after the machine turning operation for forming the seal ring retaining recesses 18 have been formed. As previously described, before forming these recesses, the end faces 57 are properly surfaced as by grinding.

FIGURES 10 and 11 illustrate a bending operation such as previously described. In FIGURE 10, the interior die forming members 58 engage diametrically opposite portions of the body band, and by suitable jacking means (not shown) these dies can be urged apart and at the same time side forming dies 59 (FIGURE 11) can be forced inwardly against the sides of the band.

In making the transition from cylindrical to oval form as described above, the bend operation can be such as to reduce the radius of the band at both ends, thus making these end portions conform to the arcuate configuration of the end portions of the assembled body, as illustrated in FIGURE 1. On the other hand, that portion of the intermediate body 12 near the bonnet block 38, can be permitted to remain at the same radius as the cylinder, and the other end portion bent to a smaller radius with the side portions being at a slight taper with respect to each other.

As described above, the block 38 is applied to the outer periphery of the metal band in the region of the weld connection between the ends of the band. It is also possible to attach the ends of the block 38 to the ends of the body band 12 as by weld connections 58, as shown in FIGURE 9. Here again, the body 12 is finished in cylindrical form, and thereafter bent to the desired oval form.

I claim:

1. In a method for the manufacture of a valve body of the type having an intermediate body part together with side plate-like body parts clamped upon opposite sides of said intermediate body part, there being resilient seal rings interposed between the body parts, the steps of forming said intermediate body part by bending a flat strip of metal into a cylinder, forming a weld connection between the ends of said strip, turning the cylinder in a metal cutting machine, and, while said cylinder is turning, cutting seal ring recesses into the ends of said cylinder.

2. In a method for the manufacture of a body for a gate valve, where the body is oval in configuration and formed of intermediate and side plate-like parts clamped together upon an intermediate body part, there being resilient seal rings interposed between the body parts, the steps of forming the intermediate body part by bending a flat strip of metal into a cylinder, forming a weld connection between the end portions of said strip, finishing the end faces of the cylinder to provide a predetermined dimensioning between said end faces, turning the cylinder about its axis in a metal cutting machine, cutting seal ring retaining grooves into the end faces of the cylinder, and thereafter bending the cylinder to substantially the form of an oval.

3. A method as in claim 2 in which a metal bonnet block is attached to the cylinder by welding, before finishing the end faces of the cylinder, the side faces of the block being finished simultaneously with the finishing operation of the end faces of said cylinder.

4. A method as in claim 3 in which the bonnet block is secured to the outer periphery of the cylinder.

5. A method as in claim 3 in which the bonnet block is interposed between the ends of the strip, and the ends of the strip welded to the ends of the bonnet block.

References Cited in the file of this patent

UNITED STATES PATENTS

| | | |
|---|---|---|
| 430,845 | Gendron | June 24, 1890 |
| 1,448,803 | Huntington | Mar. 20, 1923 |
| 2,683,581 | Rovang | July 13, 1954 |
| 2,854,743 | Gollwitzer | Oct. 7, 1958 |
| 2,870,881 | Rogge | Jan. 27, 1959 |
| 2,976,611 | Giffen | Mar. 28, 1961 |